Figure 1:
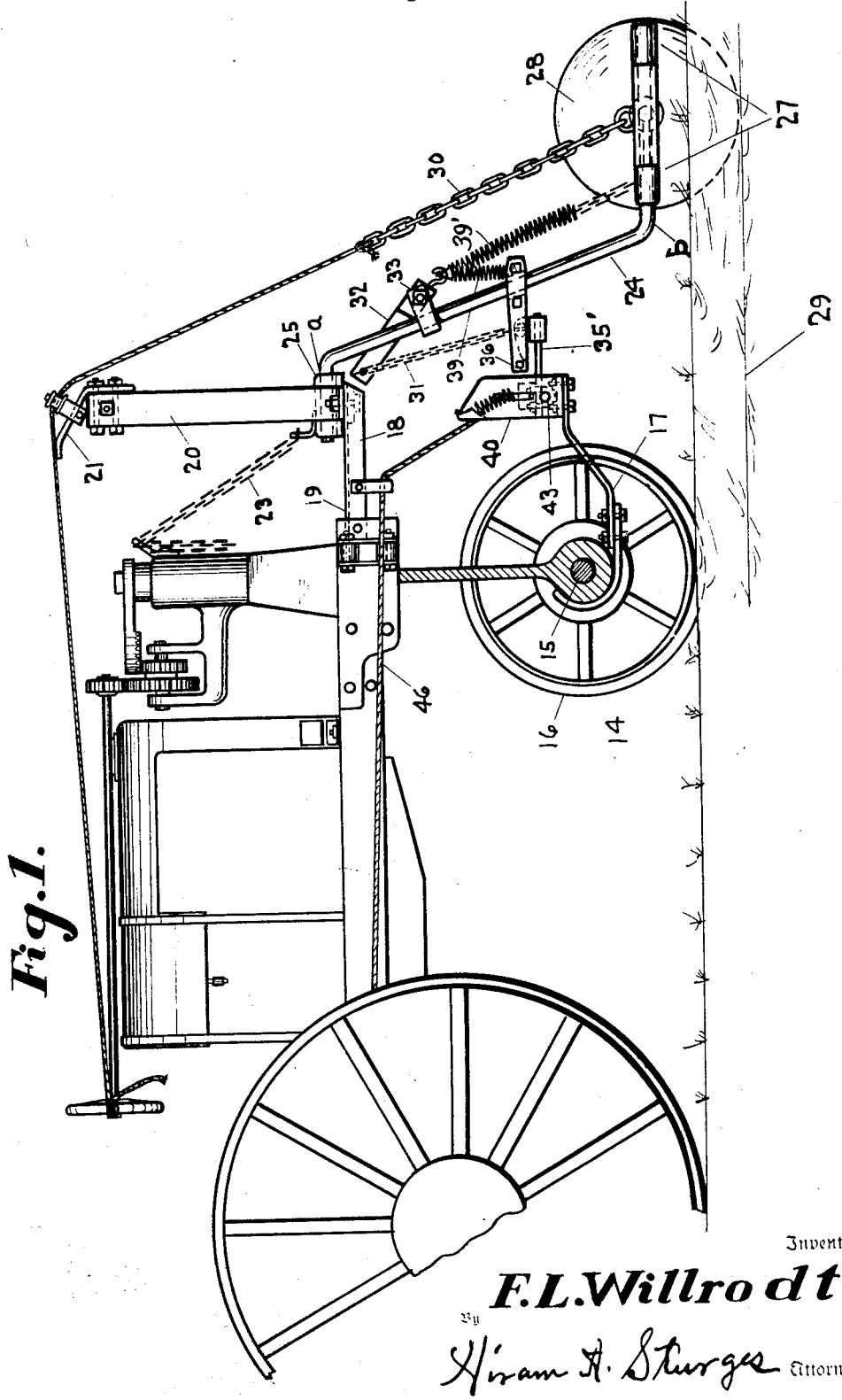

July 4, 1933.　　　F. L. WILLRODT　　　1,916,547
TRACTOR GUIDE
Filed Aug. 4, 1930　　　4 Sheets-Sheet 1

Inventor
*F.L.Willrodt*
By Hiram H. Sturges Attorney

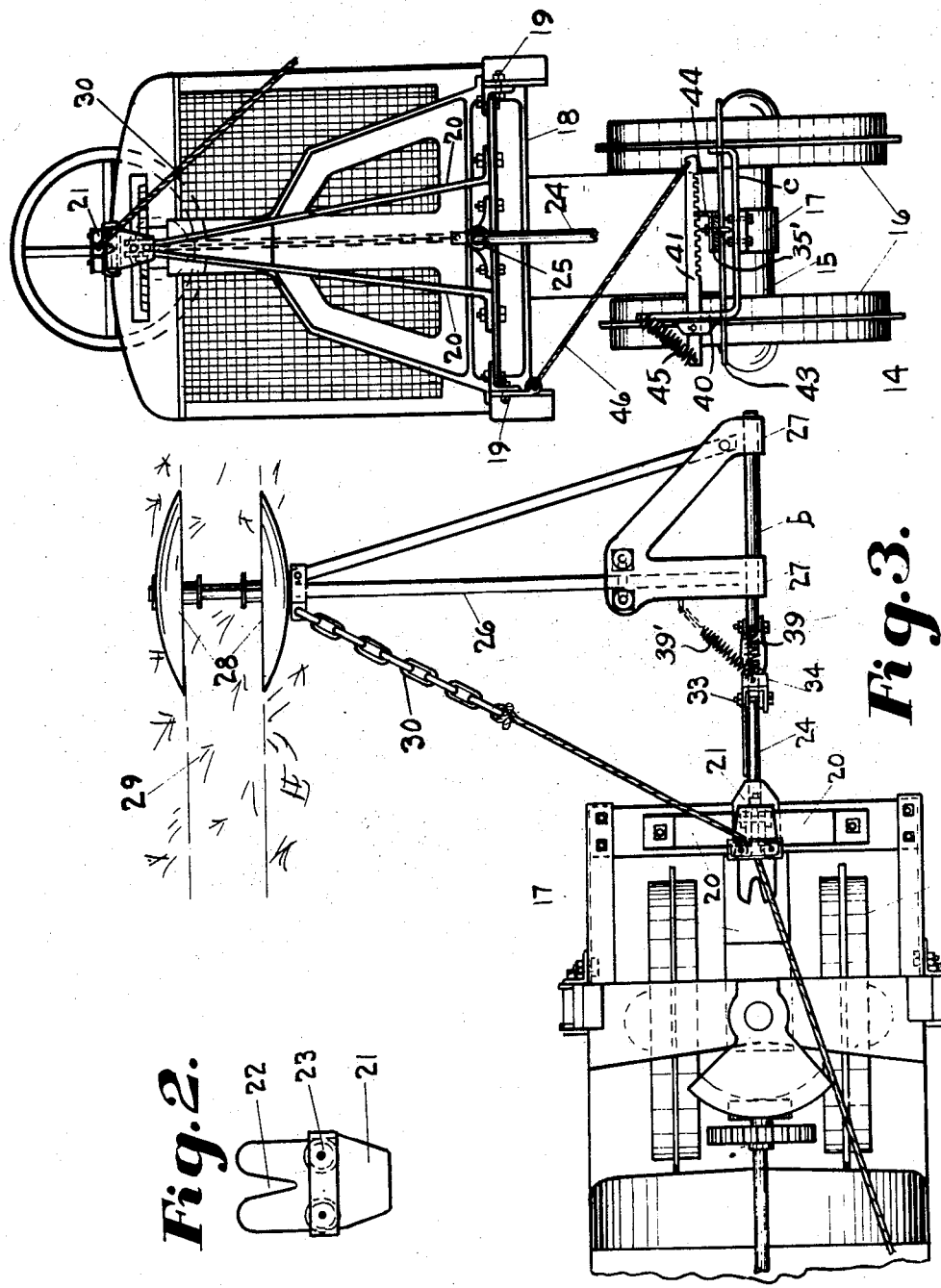

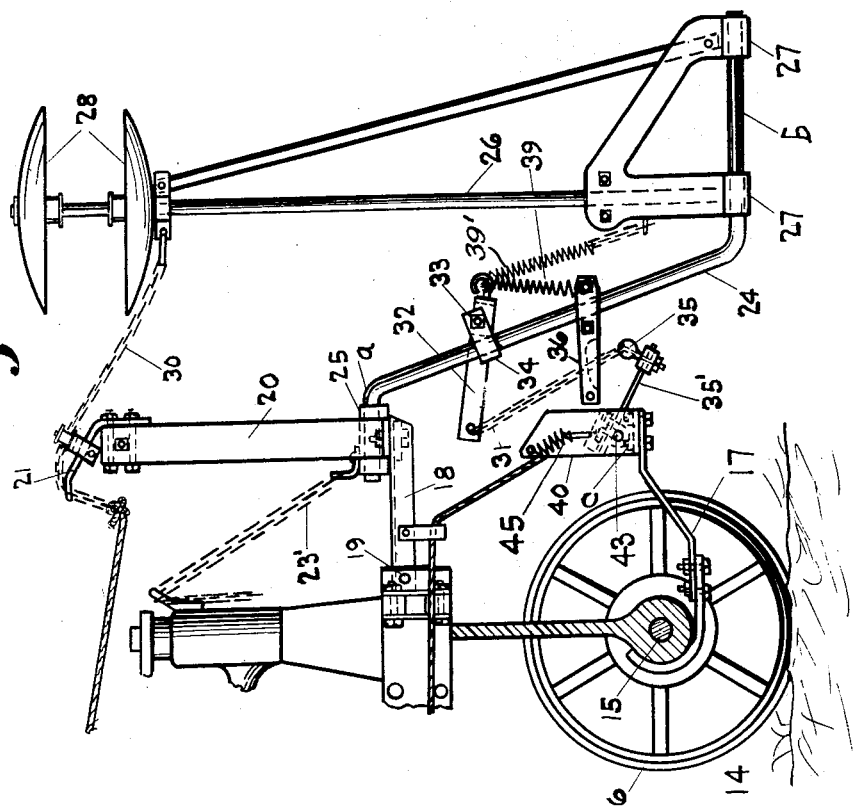
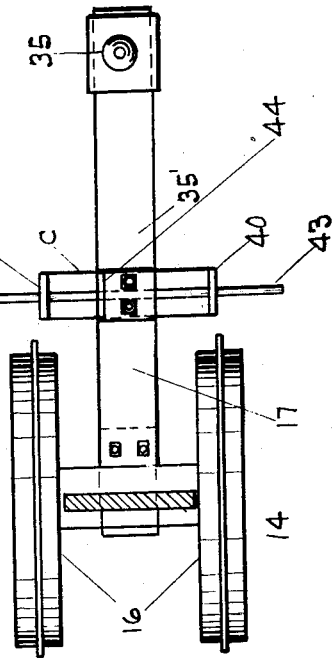
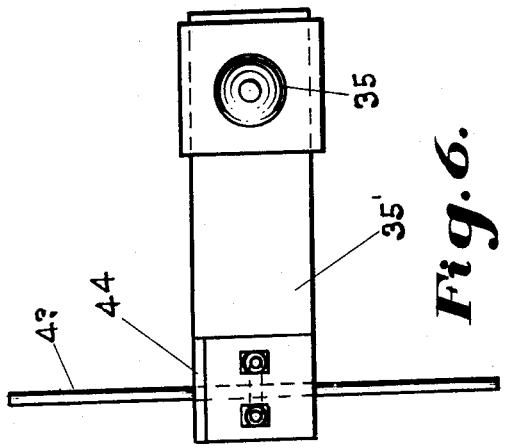

July 4, 1933.  F. L. WILLRODT  1,916,547
TRACTOR GUIDE
Filed Aug. 4, 1930  4 Sheets-Sheet 4
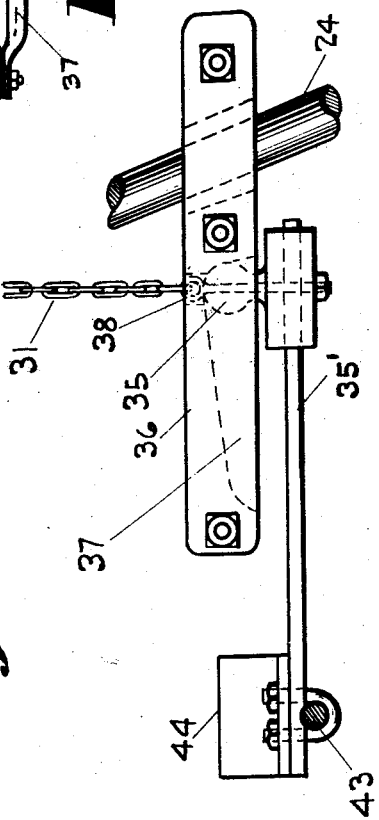
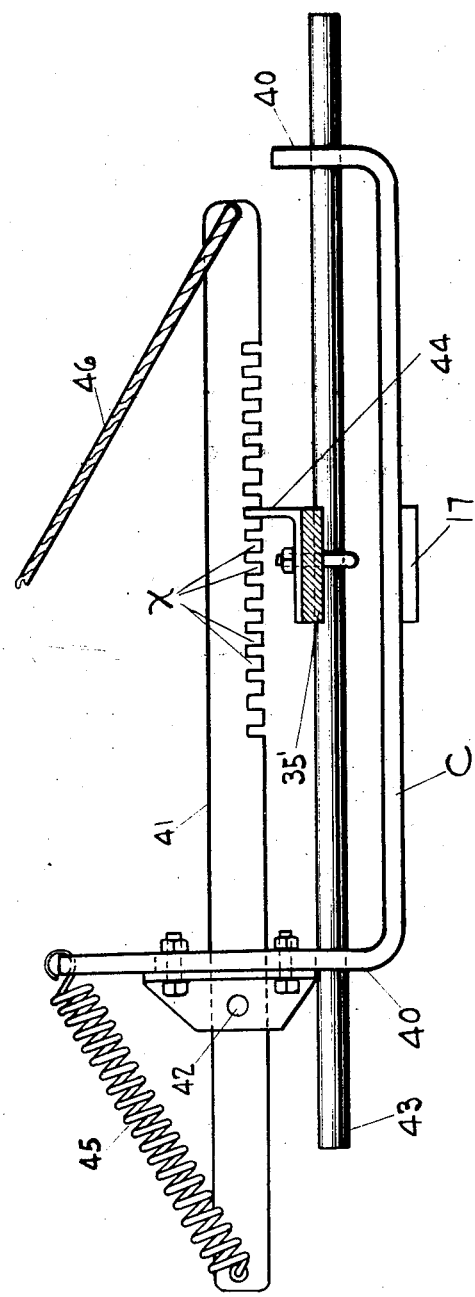
Inventor
F.L.Willrodt
By Hiram A. Sturges Attorney Patented July 4, 1933

1,916,547

UNITED STATES PATENT OFFICE

FRED L. WILLRODT, OF OMAHA, NEBRASKA, ASSIGNOR TO THE WILLRODT TRACTOR GUIDE COMPANY, OF OMAHA, NEBRASKA, A CORPORATION OF NEBRASKA

TRACTOR GUIDE

Application filed August 4, 1930. Serial No. 472,871.

This invention relates to a tractor guide of the class used for the automatic steering of tractors when plowing, listing or cultivating, the guide being disposed forwardly of the tractor and traveling in a furrow and the plows or other ground engaging implements being disposed rearwardly thereof.

One of the objects is to provide a tractor guide which may be used in connection with a steering arm rigidly secured to the axle of the truck of the tractor, so that only a limited number of parts will be required for steering, and that the cost of manufacture will be less than ordinary.

Another object is to provide an automatically operated releasing device to permit "turning about" on a limited area at the end of a field.

Still another object is to provide means for making adjustments so that a furrow may have a greater or lesser width, as may be required.

It is an object to provide a tractor guide which will be an improvement over the invention described in U. S. Letters Patent No. 1,639,246 issued Aug. 16, 1927, to Fred L. Willrodt for Steering attachments for tractors by using a lesser number of parts and more simple construction.

The invention consists of the new and useful construction, combination and arrangement of parts as described herein and claimed and as illustrated in the accompanying drawings, it being understood that changes may be made in form, size, proportion of parts and minor details, said changes being within the scope of the invention as claimed.

In the drawings, Fig. 1 is a side view, partly broken away and in section, of a tractor provided with the tractor guide.

Fig. 2 is a plan view of a chain holder. Fig. 3 is a plan view of the tractor guide attached to the truck of a tractor. Fig. 4 shows a front view of the standard and a part of the rock-bar.

Fig. 5 is a plan view showing the steering arm for the axle of the truck and parts connected with the steering arm. Fig. 6 is a plan view, being a detail relating to Figs. 5 and 7, showing a ball, an arm for the ball and an adjusting-rod. Fig. 7 is a side view partly in section showing the guide supported in an upright position.

Fig. 8 is an enlarged side view of an adjusting-plate, adjusting-rod and rack-bar. Fig. 9 is a plan view of the ball-housing shown in Fig. 10. Fig. 10 is a side view of a ball-housing, the adjusting-rod being in transverse section.

Referring now to the drawings for a more particular description, the invention is shown and described in connection with a tractor provided at its front with a truck 14 including an axle 15 and a pair of wheels 16 journalled on the axle, said axle being adapted to have horizontal swinging movements when steering or "turning about" at the end of a furrow since, as usual in such instances, a vertical shaft (not shown) is provided on which said axle may swing horizontally from its middle.

In order that the benefits may be derived as first mentioned a steering arm 17 is employed which is rigidly secured to the axle and projects forwardly therefrom. Numeral 18 indicates a frame which is normally disposed horizontally on the tractor and is hingedly mounted thereon as indicated at 19, said frame preferably having a standard or upright part 20 of inverted V-shape, and upon the top of the standard is mounted a strand-holder or chain-holder 21 having a recess 22 of V-shape and provided with a pair of rollers 23. At 23′ is indicated a chain for supporting the platform or frame 18.

Numeral 24 indicates a rock-bar having a horizontally disposed head-piece $a$ and a horizontally disposed foot-piece $b$, said head-piece $a$ being pivotally mounted on the frame 18 at the medial line of the tractor as indicated at 25.

As thus described the rock-bar 24 may have horizontal swinging movements on its mounting 25 and may have vertical movements when the frame 18 swings upwardly.

The rock-bar 24 preferably is inclined forwardly and downwardly from its pivotal mounting 25, and normally disposed in the vertical plane of the steering arm 17 at the medial line of the tractor.

The rock-bar, as will be seen, is resiliently and flexibly connected with the steering arm, this being desirable and quite necessary when "turning about" on a limited radius at the end of a field, and means to permit this operation will presently be explained.

Numeral 26 indicates an operating-bar which is mounted, as indicated at 27, to permit swinging movements on the footpiece $b$ of the rock-bar, the outer end of the operating-bar being provided with a guide or pair of discs 28 adapted to travel in a furrow 29 while the tractor is moving forwardly in the operation of plowing or similar work.

It will be understood that if a furrow is rectilinear the lower end of the rock-bar will be disposed and will remain at uniform distances from the furrow, but if the furrow has curved portions the operating-bar will be moved longitudinally and will cause a horizontal swinging movement of the rock-bar, and since the rock-bar is connected between its ends with the steering arm, the tractor will be automatically steered, that is to say,—if the furrow is curved to the right or to the left, the tractor will have correspondingly movements without any attention of an operator.

Numeral 30 indicates a combined strand and chain connected at one of its ends with the operating-bar, and used for moving the operating-bar and its guide 28 to a vertical position, said element 30 engaging the holder 20 between the rollers 23, and when the operating-bar is disposed in an upright position one of the links of the chain may engage in the V-shaped notch 22 for supporting said bar in an upright position. The bar will remain upright until the link is disengaged from said recess, and this disengagement may be effected by an operator in a well known manner by causing a swinging movement of the strand.

It will be understood that an operator while riding on the tractor may manually control the swinging movements of the operating-bar and may cause said bar to swing to either side of the line of traction, and when the tractor arrives at the end of a field the operating-bar is maintained in said upright position to permit the tractor to be "turned about".

When "turning about" at the end of a field or end of a furrow, the axle 15 is swung horizontally by operation of a conventional steering wheel and mechanism (not shown) under control of the driver, the operating-bar 26 at that time being disposed in the upright position mentioned.

In order that the truck 14 may turn on a short radius it is necessary that the rock-bar 24 shall have a flexible connection with the steering arm 17 for the reason that, while "turning about" the steering arm swings with the truck and the rock-bar swings with the tractor.

This connection consists, in part, of a flexible element 31, and while any bendable member may be used, I prefer to use a chain which is attached at its upper end to the end of a rock-arm 32 which is pivotally mounted at 33 on a clip 34 secured to the rock-bar. Another element of the connecting means is a ball 35 on the chain 31 adapted normally to engage in a ball-housing 36 which is rigidly secured to the rock-bar below the clip 34, said ball-housing preferably being provided with a groove 37 opening on its lower side and provided with an opening or slot 38 for receiving the chain. Numeral 39 indicates a spring which is attached at its upper end to the rock-arm 32, its lower end being attached to the ball-housing 36. The ball 35 is provided with an arm 35'. There is also a spring 39' attached at its upper end to the rock-arm 32 and at its lower end to the operating-bar 26 at a point spaced laterally from the foot piece $b$ of the rock-bar. On account of this method of attachment, the spring 39' is placed under tension when the operating bar and guide are lowered to operative position and this tension is relieved when the parts are raised to upright or inoperative position as shown in Figure 7.

As thus described, the ball 35 may be drawn downwardly from its housing 36 against the force of the spring 39, when the guide is in upright or inoperative position, the arm 32 rocking on its pivot 33, and, when released, the ball, by action of the spring 39, will move into its housing 36. It will be seen that if the end of the steering arm 17 is attached to the ball 35 a swinging movement of the axle 16 and steering arm 17 will cause the ball to be drawn outwardly from the housing 36 against the force of the spring 39, and this is what happens when the truck is swung on a short radius in the operation of "turning about" at the end of a field. As soon as the "turning about" of the tractor has been completed the ball will enter its housing automatically and will be held therein by force of the spring 39 until the tractor is again "turned about". However, when the guide is in operative position as shown in Figures 1 and 3, the spring 39' is placed under tension and it functions to exert a greater pull upon the rock arm 32, supplementing the action of the spring 39, so that under ordinary conditions, the ball 35 will be held in the ball housing 36 during steering movement of the steering mechanism and steering arm 17.

In operation, if the furrow has a curvature to the "off" side of the line of traction the rock-bar and steering arm will swing in a corresponding direction and therefore the rock-bar and steering arm will be disposed in approximately the same vertical plane at all times except while the tractor is being "turned about" as mentioned.

Means are provided for controlling the movements of the tractor so that it will travel nearer to or further from the furrow so that the new furrow to be formed may have a greater or lesser width. If the ground is hard or covered with a heavy sod a narrow furrow may be desired, and in other instances wide and deep furrows may be required. In order that this control may be made I provide adjustable coupling members for the ball 35 and steering arm 17 now to be described.

An adjusting-plate is indicated at c. It is disposed transversely of and is secured to the end of the steering arm 17, said plate being provided at its ends with upright apertured ears 40, and at 41 is indicated a rack-bar which is pivoted at 42 on said plate. At 43 is indicated an adjusting-rod which is slidingly mounted in the ears of the plate 39, said rod being provided with a tooth or projection 44 adapted to engage in any selected notch x of the rack-bar, a spring 45 being mounted on an ear 40 of said plate and connected with the rack-bar 41 for maintaining the projection 44 in any selected notch of the rack-bar, thus providing an adjustable coupling connection between the rock-bar and steering arm.

Numeral 46 indicates a pull-rope for use of an operator as an aid in causing a swinging movement of the rack-bar 41 to permit adjustments to be made, and it will be seen that the parts may be adjusted in such a manner that the ball-housing 36 will be disposed in alignment with the steering arm 17.

The adjusting-rod 43 is rigidly connected with the ball 35, and if said rod is slidingly moved on the adjusting-plate c toward the "off" side of the tractor and is secured in said position with its projection 44 engaging a selected notch of the rack-bar, the tractor will travel somewhat nearer to the furrow to effect the formation of a furrow of lesser width, and a furrow of greater width may be formed simply by adjusting the parts so that the projection 44 of the rod 43 will be disposed nearer to the "near" end of said plate c.

It will be seen that the adjustments mentioned may be readily made whenever required and these features are important in the operation of plowing. It has been stated that the ball-housing 36 may be maintained in alignment with the steering arm 17 and it will be seen that when the adjustments of the coupling members have been made for the formation of wide or narrow furrows the ball-housing will be maintained in non-alignment with said steering arm, and these features are considered new and will be included in the appended claims.

I claim as my invention,—

1. In a guide for a tractor having a steerable axle, a steering arm rigidly mounted on the steerable axle of the tractor, a rock-bar normally pivotally connected with the steering arm and mounted on the tractor to permit lateral swinging movements, and an operating-bar mounted on the rock-bar and having a guide to engage in a furrow for moving the operating-bar, the rock-bar and said steering arm, said guide being adjustable to an inoperative position and said rock bar being flexibly and resiliently connected with said steering arm to permit independent movement of the latter when said guide is in such position to permit normal steering of said steerable axle.

2. In a guide for a tractor having a steerable axle, a steering arm rigidly mounted on the steerable axle of the tractor, a rock-bar normally operatively connected with the steering arm and mounted on the tractor to permit lateral swinging movements and vertical swinging movements therefrom, and an operating-bar mounted on the rock-bar having a guide to travel in a furrow for moving said operating-bar, said rock-bar and said steering arm, said guide being adjustable to an inoperative position and said rock-bar being flexibly and resiliently connected with said steering arm to permit independent movement of the latter when said guide is in such position to permit normal steering of said steerable axle.

3. In a guide for a tractor having a steerable axle, a steering arm rigid with the steerable axle of the tractor, a rock-bar normally operatively connected with the steering arm and mounted on the tractor to permit lateral swinging movements therefrom, an operating-bar mounted on the rock-bar and having a guide adapted to travel in a furrow for moving the operating-bar, the rock-bar and steering arm, said guide being movable to an inoperative position and said rock-bar being resiliently connected with said steering arm to permit independent movement of the latter when said guide is in such position to permit normal steering of said steerable axle, and additional resilient means tending to prevent such independent movement when the guide is in operative position.

4. In a guide for a tractor having a steerable axle, a steering arm rigidly mounted on the steerable axle of the tractor, a rock-bar normally operatively connected with the steering arm and mounted on the tractor to permit lateral swinging movements from a vertical plane, an operating-bar mounted on the rock-bar and having a guide adapted to travel in a furrow for actuating the operating-bar, said rock-bar and said steering arm, said guide being movable to an inoperative position, a downwardly opening ball housing on said rock-bar, a ball pivotally connected with said steering arm and adapted to enter said housing, a rock arm pivoted on said rock bar, flexible connections between said rock arm and ball for retaining the latter in said housing, and a spring acting on said rock arm to hold it in ball-retaining position but permitting it to move therefrom when said guide is in inoperative position to permit normal steering of said steerable axle.

5. In a guide for a tractor having a steerable axle, a steering arm rigidly secured to the steerable axle of the tractor, a rock-bar mounted on the tractor to permit lateral swinging movements relative thereto and provided with a ball-housing, a connecting means between the steering arm and rock-bar including a spring-controlled ball normally engaging in said ball-housing, and an operating-bar mounted on the rock-bar and having a guide adapted to travel in a furrow for moving the operating-bar, the rock-bar and said steering arm.

6. In a guide for a tractor having a steerable axle, a steering arm mounted on the steerable axle of the tractor, a frame hingeably mounted on the tractor to permit up and down movement of the outer end of said frame, a rock-bar pivotally mounted on said outer end and operatively connected with the steering arm, and an operating-bar mounted on the rock-bar and having a guide adapted to travel in a furrow for actuating the operating-bar, said rock-bar and said steering arm, the hingeable mounting of said frame permitting an upward yielding of the rock-bar, operating-bar and guide.

7. In a guide for a tractor having a steerable axle, a steering arm rigid with the steerable axle of the tractor, a horizontal frame hingeably mounted on the tractor for up and down adjustment, a standard mounted on the frame and provided with a holder having a V-shaped recess, a rock-bar mounted to permit lateral swinging movements from said frame and connected with the holder, an operating-bar mounted on the rock-bar to permit movements in a circle's arc therefrom, discs journalled on the operating-bar and adapted to travel in a furrow for moving the operating-bar, said rock-bar and said steering arm, the hingeable mounting of said frame permitting upward yielding of the outer end of said operating-bar, flexible connections between the tractor and the frame to limit downward movement of the latter, and a means connected with the operating-bar adapted to engage the steering arm in the V-shaped recess of said holder to maintain the operating bar and discs in inoperative position.

8. In a guide for a tractor having a steerable axle, a steering arm rigidly mounted on the steerable axle of the tractor, a rock-bar mounted on the tractor to permit swinging movements, detachable ball-and-socket connections between said rock-bar and the steering arm, and an operating-bar pivotally mounted on the rock-bar and having a guide adapted to travel in a furrow for moving the rock-bar and steering arm.

9. In a guide for a tractor having a steerable axle, a steering arm rigidly mounted on the steerable axle of the tractor, a rock-bar mounted on the tractor and provided with a ball-housing, a spring-controlled ball connected with said steering arm and normally engaging said ball-housing, means for maintaining the ball-housing approximately in alignment with the steering arm of the axle and for allowing said steering arm to assume positions in non-alignment with said ball housing at times, and a spring-controlled operating-bar pivotally mounted on the rock-bar and having discs journalled thereon for engaging in a furrow to cause actuation of the operating-bar, the rock-bar and said steering arm.

10. In a guide for a tractor having a steerable axle, a steering arm rigidly mounted on the steerable axle of the tractor, a rock-bar pivotally mounted on said tractor and provided with a ball-housing, a spring-controlled ball normally engaging the ball-housing of the rock-bar, adjustable coupling means for causing the ball-housing to assume positions in alignment or non-alignment with said steering arm, an operating-bar provided with a guide for engaging in a furrow and mounted on the rock-bar to permit swinging movements to either side of the line of traction, said operating-bar being movable longitudinally for actuating the rock-bar and said steering arm.

11. In a guide for a tractor having a steerable axle, a steering arm rigidly secured to the steerable axle of the tractor and provided with a coupling-member, a rock-bar mounted on the tractor and having a coupling-member coacting with the coupling-member of the steering arm, an operating-bar mounted to permit swinging movements on the rock-bar transversely of the line of traction and having a guide adapted to travel in a furrow for moving the operating-bar, the rock-bar and said steering arm, said coupling-members being adjustable relative to each other for controlling the normal relative positions of the steering arm and said rock-bar in vertical planes, and for thereby controlling the position of said guide with respect to lateral spacing from the median line of the tractor.

12. In a guide for a tractor having a steerable axle, a steering arm rigidly secured to the steerable axle of the tractor, a coupling member including a plate rigidly mounted on said steering arm and a spring-controlled rack-bar pivoted on said plate, a rock-bar mounted on the tractor to permit transverse swinging movements and normally disposed in the vertical plane of the steering arm, a coupling-member carried by the rock-bar including an arm having a projection in engagement with one of the notches of said rack-bar, an operating-bar mounted to permit swinging movements from the rock-bar and and having a guide for engaging in a furrow to cause actuation of said operating-bar, said rock-bar and said steering arm, said coupling-members being adjustable relative to each other for controlling the normal relative positions of the steering arm and said rock-bar with respect to vertical planes.

In testimony whereof, I affix my signature.

FRED L. WILLRODT.